US011787992B2

(12) United States Patent
Cadix et al.

(10) Patent No.: US 11,787,992 B2
(45) Date of Patent: Oct. 17, 2023

(54) SUSPENSION OF ASSOCIATIVE POLYMERS FOR THE TREATMENT OF UNDERGROUND FORMATIONS

(71) Applicant: ENERGY SOLUTIONS (US) LLC, Princeton, NJ (US)

(72) Inventors: Arnaud Cadix, Lille (FR); David James Wilson, Coye-la-Forêt (FR)

(73) Assignee: ENERGY SOLUTIONS (US) LLC, Princeton, NJ (US)

( * ) Notice: Subject to any disclaimer, the term of this patent is extended or adjusted under 35 U.S.C. 154(b) by 0 days.

(21) Appl. No.: 17/436,949

(22) PCT Filed: Mar. 3, 2020

(86) PCT No.: PCT/EP2020/055586
§ 371 (c)(1),
(2) Date: Sep. 7, 2021

(87) PCT Pub. No.: WO2020/178294
PCT Pub. Date: Sep. 10, 2020

(65) Prior Publication Data
US 2022/0169911 A1 Jun. 2, 2022

(30) Foreign Application Priority Data
Mar. 5, 2019 (FR) ..................... 1902209

(51) Int. Cl.
*C09K 8/516* (2006.01)
*C09K 8/508* (2006.01)

(52) U.S. Cl.
CPC ............ *C09K 8/5086* (2013.01); *C09K 8/516* (2013.01)

(58) Field of Classification Search
CPC ....... C09K 8/5086; C09K 8/516; C09K 8/508
See application file for complete search history.

(56) References Cited

U.S. PATENT DOCUMENTS

| | | |
|---|---|---|
| 4,432,881 A | 2/1984 | Evani |
| 4,565,647 A | 1/1986 | Llenado |
| 6,607,035 B1 | 8/2003 | Reddy et al. |
| 2005/0199390 A1 | 9/2005 | Curtice et al. |
| 2005/0230113 A1 | 10/2005 | Eoff et al. |
| 2012/0132422 A1 | 5/2012 | Mirakyan et al. |
| 2018/0148635 A1* | 5/2018 | Shen ................. C09K 8/80 |

FOREIGN PATENT DOCUMENTS

| | | |
|---|---|---|
| CN | 104341548 A | 2/2015 |
| CN | 106661232 A | 5/2017 |
| EP | 0188856 A1 | 7/1986 |
| FR | 2794464 A1 | 12/2000 |
| NO | 2016193334 A1 | 12/2016 |
| WO | 9630421 A1 | 10/1996 |
| WO | 9801478 A1 | 1/1998 |
| WO | 9858974 A1 | 12/1998 |
| WO | 9931144 A1 | 6/1999 |
| WO | 9935177 A1 | 7/1999 |
| WO | 9935178 A1 | 7/1999 |
| WO | 0075207 A1 | 12/2000 |
| WO | 0142312 A1 | 6/2001 |
| WO | 0226836 A2 | 4/2002 |
| WO | 03068827 A1 | 8/2003 |
| WO | 03068848 A2 | 8/2003 |
| WO | 2005021612 A1 | 3/2005 |
| WO | 2018102270 A1 | 6/2018 |

OTHER PUBLICATIONS

International Search Report issued in corresponding International Application No. PCT/EP2020/055586; dated May 11, 2020 (2 pages).
Written Opinion of the International Searching Authority issued in corresponding International Application No. PCT/EP2020/055586; dated May 11, 2020 (6 pages).

* cited by examiner

*Primary Examiner* — Kumar R Bhushan
(74) *Attorney, Agent, or Firm* — Osha Bergman Watanabe & Burton LLP

(57) ABSTRACT

This invention relates to the field of techniques for treating subterranean formations with gels during an oil or gas exploration or production operation, i.e., during drilling, completion, or hydraulic fracking processes. The invention relates in particular to a system making it possible to limit or even inhibit the phenomena known as loss of fluids (wager and/or gas) in an underground formation, particularly in a zone where the temperature is high.
More particularly, the invention relates to a suspension (S) comprising:
an aqueous phase containing salts; and
within said aqueous phase, particles (p) based on associative polymers (P).

18 Claims, No Drawings

SUSPENSION OF ASSOCIATIVE POLYMERS FOR THE TREATMENT OF UNDERGROUND FORMATIONS

TECHNICAL FIELD

This invention relates to the field of techniques for processing subterranean formations with gels during an oil or gas exploration or production operation, i.e., during drilling, completion of hydraulic fracking processes. The invention relates in particular to a system making it possible to limit or even inhibit the phenomena known as fluid loss (water and/or gas) in a subterranean formation, particularly in a high-temperature area.

BACKGROUND

One of the most severe operational problems during oil and gas exploration and production is the loss of circulation during drilling (referred to as "lost circulation"). Loss of circulation is a well-known problem, expensive and complex to solve, which tends to occur when the hydrostatic overpressure applied by the drilling mud creates fractures in the rocks surrounding the unconsolidated sections of the well under construction or if the trephine encounters natural fractures or layers of cavernous rock. The drilling mud may then be lost to the rock formation, which may mean that the pressure naturally present in the formation cannot be balanced. In addition, drill cuttings can no longer be removed from the well. Depending on its severity, a situation of loss of circulation induces more or less risk of damage to the well, which can go as far as the loss of the latter and/or drilling tools as well as a risk of endangering operators on the drilling platform.

Damaging situations caused by fluid loss may also be observed in other operations, such as when the fluid is pumped at a high rate with great overpressure to create fractures in the formation. In the case of excessive rock fracturing, it is also desirable to avoid fluid penetration into the formation, at least for economic and/or environmental reasons. This also limits damage to the formation, i.e., reduced productivity due to partial plugging of the rock near the newly created fracture.

To inhibit the losses, or at least to reduce them to an acceptable level, injection of a delayed gelation system has been proposed in an attempt to form a gel in the area where the losses occur, typically by a previously solubilized gelation of a compound.

Different types of delayed gelation systems capable of locally forming a gel at the bottom of the well have been described in this regard, for example, triggered by the pH or temperature adjustment, intended to prevent losses and to resume the circulation of the sludge drilling and drilling. By way of example, delayed gelling systems have been described based on a delayed chemical reaction as a function of temperature (transamidification of polyacrylamide by a polyethyleneimine triggered by temperature, for example). Such systems, which have been described in particular in U.S. Pat. No. 6,607,035, US 2005/02301 13 or US 2012/0132422, lack control over the location of the gelation as well as its yield and its effectiveness due to the fact that it is a triggering chemical reaction between two components of different size, solubility, and chemical affinity.

Other delayed gelation systems described in the past rely on mixtures of reactive components initially separated and intended to be placed into contact in situ only. These systems need specific dispensing tools to ensure that there is no premature mixing during pumping. By way of example, reference may be made to the document US 2005/0199390. Once at the target location, it is difficult to ensure that sufficient mixing takes place, especially when the reagents have a high viscosity. This implementation is very time-consuming and, in most cases, does not offer good assurance that the products will be mixed in the immediate vicinity of the area to be treated.

There is a continuing need for efficient and easy-to-use systems to limit the phenomena of fluid losses, more particularly circulation losses during underground formation, in particular in areas at great depth where the temperature is elevated.

SUMMARY

One subject-matter of this invention is to provide a novel means of limiting or inhibiting the loss of fluids in a subterranean formation that is easy to prepare and use in the end application.

To this end, this invention proposes the use of a suspension that has relatively low viscosity, and that is pumpable as such, but whose viscosity increases following injection under the effect of the increase in the viscosity temperature, which makes it possible to obtain an effect of limiting or inhibiting the loss of fluids in the subterranean formation.

More precisely, according to a first aspect, the invention relates to a suspension (S), comprising:
an aqueous phase containing salts; and
within said aqueous phase, particles (p) based on associative polymers (P).

Typically, the aqueous phase is a continuous phase.

The term "suspension" is understood to mean a composition in the dispersed state, in an aqueous phase, comprising isolable particles, typically particles which may be separated from the aqueous phase by filtration.

Therefore, suspensions of polymer particles within the meaning of this description are distinguished in particular from polymer solutions or even gels. This is because solutions and gels do not contain separable particles but polymers in dissolved or gel form, which cannot be isolated from an aqueous phase. On the contrary, when a suspension (S), according to the invention, is subjected to filtration at room temperature, particles based on polymers (P) retained by the filter and an aqueous phase are separated as the filtrate.

DETAILED DESCRIPTION

In the suspension (S) of this invention, the particles (p) of associative polymers are present in a particular form, i.e., they are hydrated, but only partially, and only to a small extent to preserve the isolable (filterable) character of the particles (complete or excessive hydration will cause the polymers to become solubilized and/or gelled). The level of hydration of the particles is reflected by the rate of hydration (also called "swelling rate") of the polymer particle expressed from the total mass of the polymer particles in the suspension (m1) (including polymers (P) and also saltwater) relative to the total mass of polymers present in the particles (m0) (excluding water and salts). The swelling rate may thus be calculated by $(m1-m0)/m0$.

According to a particular subject-matter, the invention also relates to a method for preparing a suspension (S) as described above, in which particles (p0) based on non-hydrated associative polymers (P) are mixed with water and salts, whereby partially hydrated particles (p) dispersed in an aqueous phase are obtained.

Typically, the suspension (S) is prepared by mixing, with stirring, a suitable amount of the particles based on associative polymers in an aqueous saline solution, for example, using polymers in the form of a non-hydrated powder. This preparation takes place before injection into the subterranean formation. Therefore, the suspension (S) of this invention is easy to prepare. This constitutes one of the advantages of this invention.

The salts used may typically be selected from monovalent, divalent, and multivalent salts. Thus, for example, the salts may be selected from NaCl, KCl, $CaCl_2$, and/or mixtures thereof.

The salt content in the suspension is expressed as the total mass of salt relative to the total mass of the aqueous phase of the suspension.

Typically, according to one embodiment, the salt content in the aqueous phase of the suspension is at least 5%, preferably between 8% and 30%, for example, between 10 and 25% by mass of the total mass of the aqueous phase of the suspension (S).

practice, the hydration rate is measured by the total mass of water and salts absorbed by the particles (p) relative to the total mass of the particles (p0).

In the context of the invention, the swelling ratio for the particles is generally less than 50 g/g (i.e., 50 g of absorbed salt solution per 1 g of non-hydrated particles), preferably less than 40 g/g, for example, less than 30 g/g. The swelling rate is typically greater than 1 g/g, for example, greater than 10 g/g.

The swelling rate may be measured according to the following protocol: polymer in the form of a non-hydrated powder is placed in a pre-tared sachet, the sachet is immersed in a saline solution similar to the aqueous medium of the suspension (S) for a period of one hour. Then, the excess solution is blotted from the outside of the sachet with absorbent paper, the mass of the partially hydrated particles is measured, and the swelling rate is expressed in grams of saline solution absorbed per gram of powdered polymer.

Reference may be made in particular to the method known as "tea-bag" described in Iranian polymer Journal (Mohammad J. Zohuriaan-Mehr and Kourosh Kabiri, 2008).

In the context of this invention, it has been observed that the presence of the salts in the suspension (S), at room temperature, at least partially inhibits the phenomenon of associative polymer particle hydration (P). In general, the higher the concentration of salts, the more noticeable the effect is. Therefore, by using a sufficient quantity of salts in the suspension (S), partial inhibition of associative polymer particle hydration is ensured in an amount sufficient to allow a suspension of isolable particles to be obtained, typically by filtration. Furthermore, the pumpability of this suspension is ensured at room temperature.

Furthermore, it has been demonstrated in the context of the invention that the inhibition of hydration by the salts tends to decrease with the temperature. Therefore, associative polymer hydration is obtained by bringing the suspension (S) to a sufficient temperature, inducing gelation.

Thus, the level of salts in the aqueous phase may be easily modulated for an area to be treated with a given temperature in order to obtain gelation of the suspension (S) specifically in the area to be treated. This modulability constitutes another advantage of the suspension of the invention.

According to another aspect, the invention relates to an application of this suspension's property, i.e., the use of the suspension as mentioned above (S) to limit or even inhibit the loss of fluids in an underground formation.

In this context, the invention relates in particular to a method for limiting or inhibiting a loss of fluid within a subterranean formation, comprising a step (Et) in which a suspension (S), as defined above, is injected into said subterranean formation at the level of the zone exhibiting the loss of fluids, where the suspension's injection temperature (Ti) is below the critical gelation temperature of the suspension; and the temperature in the zone to be treated (Tz) is a temperature equal to or greater than the suspension's critical gelation temperature, whereby an increase in the viscosity of the suspension is obtained.

In the context of this invention, gelation of the associative polymer will not take place until the suspension reaches a limit temperature known as "the critical gelation temperature."

For the purposes of this invention, the term "critical gelation temperature" of a suspension (S) is understood to mean the critical temperature above which the associative polymers gel. In other words, for a given suspension, there is a temperature limit value below which the suspension based on associative polymers that may be isolated from the aqueous phase by filtration and beyond which the polymers may hydrate to form a gel and that therefore may no longer be isolated from the aqueous phase by filtration.

The critical gelation temperature of a suspension (S) generally increases as the salt level in the aqueous phase increases.

Thus, this invention provides a simple and effective means for controlling the formation of a gel induced by an associative polymer (P) in the area to be treated to ensure the effect of limiting the loss of fluids in this area while allowing easy injection of the polymer (induced in the form of a low viscosity suspension).

In other words, the suspension (S) of the invention is pumpable at the processing and injection temperature and gels upon exposure to a temperature equal to or greater than the critical gelling temperature, which allows easy preparation of the suspension before use, a few hours or even several days before use, for example, and gel formation in the targeted area.

"Associative polymer" is understood to mean, within the sense of this description, a water-soluble polymer capable of increasing the viscosity of an aqueous medium by associations involving hydrophobic-hydrophobic interactions between the polymers. These are generally amphiphilic polymers comprising a chain of hydrophilic nature formed by hydrophilic monomers (mh) and including, along the chains and/or at all or part of the ends of these, small quantities. Generally, a few molar percent at the most, of units of hydrophobic nature formed by hydrophobic monomers (mH) Typically, the molar ratio mH/(mh+mH) is between 0.001% at 10%, for example, between 0.05 and 5%.

In certain cases, crosslinking monomers (mR) may be present on the associative polymers' (P) hydrophilic chain. Crosslinkers (mR) may typically be hydrophilic.

The associative polymer of this invention typically has an average molecular mass (Mw) by weight greater than 500,000 g/mol, preferably greater than 1,000,000 g/mol, particularly between 2,000,000 and 10,000,000 g/mol.

According to one embodiment of this description, the associative polymers (P) comprise at least one chain (C) obtained by micellar polymerization. The chain (C) is typically water-soluble and principally formed of a chain of hydrophilic units interrupted at different places by a plurality of chains of hydrophobic units (B) of substantially identical size. Thus, the polymer of the invention may be constituted by the chain (C) or a block copolymer where the chain (C) constitutes one of the blocks.

According to one preferred embodiment, the associative polymers (P) are obtained by micellar polymerization.

The hydrophobic sequences (B) are preferably non-water-soluble polymeric sequences typically having a solubility at 20° C. of less than or equal to 0.1% (1,000 ppm) in water.

For the purposes of this description, the term "micellar radical polymerization" is understood to mean a polymerization which will also be designated by "micellar polymerization" for the purposes of brevity in the remainder of the description, in which block polymers of the multiblock type are synthesized by copolymerization hydrophilic monomers and hydrophobic monomers in an aqueous dispersant medium (typically water or a water/alcohol mixture) that includes:

hydrophilic monomers in the dissolved or dispersed state in said medium; and hydrophobic monomers present in micelles.

The micelles used in micellar polymerization are formed in the aqueous medium by a surfactant forming these micelles, which is introduced into said medium at a concentration greater than its critical micellar concentration (cmc) in the presence of the hydrophilic monomers in the medium (M).

According to one particular embodiment, the hydrophobic monomers present within micelles used in micellar polymerization may be monomers that have the property of forming micelles themselves without having to add additional surfactants (these monomers are known as "self-micellating" in the remainder of the description). Thus, according to this particular mode, the surfactant used to form the micelles may be the hydrophobic self-micellating monomer itself used without any other surfactant. However, the presence of an additional surfactant is not excluded when self-micellating monomers are used.

Thus, within the meaning of this description, when mention is made of "hydrophobic monomers within micelles," this concept notably encompasses:

mode 1: hydrophobic monomers present within micelles formed by surfactants, where said surfactants are distinct from hydrophobic monomers; and/or mode 2: self-micellating monomers forming micelles by themselves in an aqueous medium, with micelles which may then be formed in whole or in part by said self-micellating monomers.

Modes 1 and 2 mentioned above are compatible and may coexist (non-self-micellating hydrophobic monomers within micelles formed by another self-micellating monomer, for example; or else micelles comprising a combination of surfactants and self-micellating monomers).

In micellar polymerization, the hydrophobic monomers contained in the micelles are known as being in a "micellar solution." The micellar solution referred to is a micro-heterogeneous system that is generally isotropic, optically transparent, and thermodynamically stable.

It should be noted that a micellar solution of the type used in micellar polymerization is to be distinguished from a microemulsion. In particular, unlike a microemulsion, a micellar solution is formed at any concentration exceeding the critical micellar concentration of the surfactant used, with the sole condition that the hydrophobic monomer is soluble at least to some extent within the internal space of the micelles. A micellar solution also differs from an emulsion by the absence of an internal homogeneous phase: micelles contain a very low number of molecules (typically less than 1000, generally less than 500 and typically 1 to 100, most often from 1 to 50 monomers and at most a few hundred molecules of surfactant when a surfactant is present) and the micellar solution generally has similar physical properties to surfactant micelles without monomers. In addition, most often, a micellar solution is transparent to visible light, given the small size of the micelles, which does not lead to diffusion phenomena, unlike the drops of an emulsion, which refract light and give it its characteristic cloudy or white appearance.

The micellar polymerization technique leads to characteristic block polymers, each containing several hydrophobic blocks of substantially the same size and where this size may be controlled. Indeed, due to the confinement of the hydrophobic monomers within the micelles, each of the hydrophobic blocks formed is of controlled size and substantially contains a defined hydrophobic monomer number nH, this number nH may be calculated as follows (Macromolecular Chem. Physics, 202, 8, 1384-1397, 2001):

$$nH = N_{agg} \cdot [M_H]/([\text{surfactant}] - \text{cmc})$$

or:

$N_{agg}$ is the aggregation number of the surfactant, which reflects the number of surfactants present in each micelle $[M_H]$ is the molar concentration of hydrophobic monomer in the medium and

[surfactant] is the molar concentration of surfactant in the medium cmc is the critical micellar (molar) concentration In the context of this invention, the number nH is generally greater than or equal to 3, preferably greater than or equal to 4, for example, greater than or equal to 6.

The nH number generally remains below 30.

According to one preferred embodiment, the number nH is between 4 and 20 (limits included), for example, between 6 and 15.

In the context of this invention, the carbon number included in each of the hydrophobic blocks formed is of controlled size and typically greater than 48. For example, when a hydrophobic block comprises monomers having a carbon number equal to C12 and when the number nH is between 4 and 12, the carbon number included in this hydrophobic block is between 48 and 144.

Generally, the carbon number carried by each of the hydrophobic blocks is less than 300.

A micellar polymerization may typically be used according to the invention, where it is copolymerized (typically by the radical route) in an aqueous dispersant medium (typically water or a water/alcohol mixture):

hydrophilic monomers in the dissolved or dispersed state in said medium; and hydrophobic monomers within surfactant micelles formed in said medium by introducing this surfactant at a concentration above its critical micellar concentration (cmc).

According to one particularly interesting embodiment, the chain (C) of associative polymers (P) is obtained by a method comprising a micellar free-radical polymerization step (E) in which contact is made in an aqueous medium (M):

hydrophilic monomers (mh), dissolved or dispersed in said aqueous medium (M) (typically water or a water/alcohol mixture);

hydrophobic monomers (mH) in the form of a micellar solution, i.e., containing, in the dispersed state within the medium (M), micelles comprising these hydrophobic monomers (this dispersed state may, in particular, be obtained by using at least one surfactant); and preferably at least one radical polymerization initiator, this initiator typically being water-soluble or water-dispersible; and preferably, at least one radical polymerization control agent.

In general, the molar ratio (mH)/(mh+mH) in step (E) corresponds to the ratio of the mass of the hydrophobic monomers relative to the total mass of the hydrophilic and hydrophobic monomers is greater than or equal to 0.05%, preferably greater than 0.1%, or even greater than 0.2%, and less than or equal to 5%. In general, the percentage of hydrophobic units in the chain (C) is on the same order, typically greater than or equal to 0.05%, preferably greater than 0.1%, or even greater than 0.2%, and less than or equal to 5%.

The aqueous medium (M) used in step (E) is a medium comprising water, preferably in an amount of at least 50% by mass, or even at least 80%, for example, at least 90%, or even at least 95% by mass. This aqueous medium may optionally include solvents other than water, for example, water-miscible alcohol. Thus, the medium (M) may be, for example, a water-alcoholic mixture.

According to one possible variant, the medium (M) may comprise other solvents, preferably in a concentration where said solvent is miscible with water, which may, in particular, make it possible to reduce the quantity of stabilizing surfactants used. Thus, for example, the medium (M) may comprise pentanol or any other additive making it possible to modulate the aggregation number of the surfactants. However, in general, it is preferable that the medium (M) is a water-continuous phase and consists of one or more solvents and/or additives that are miscible with each other and with water in the concentrations in which they are used. According to one possible embodiment, the medium (M) may comprise salts.

When step (E) is carried out, the polymers, according to the invention, comprise chains (C) which have a structure known as a "controlled" structure, i.e., that all the chains (C) present on the polymers have substantially the same size and same structure. In particular, the chains (C) include the blocks (B) substantially in the same number and proportion.

In the context of this invention, step (E1) is generally carried out after step (E), in which the polymers obtained from step (E) are dried and ground (if necessary), whereby the polymers are obtained in the form of granular solids, for example, in the form of powders.

According to one embodiment, the polymers obtained are typically in the form of solid particles of dimensions less than 4 mm, more preferably less than 3 mm, and typically greater than 50 µm and more preferably greater than 100 µm. The size of the particles obtained may be measured, for example, by sieving.

Traditional means of grinding and drying known to those skilled in the art may be used. Examples include fluid bed drying techniques and grinding by pin mills, hammer mills, ball mills, and air-jet mills. In addition, these techniques may optionally be implemented according to the cryo-grinding mode.

Different advantages and particular embodiments of the invention will now be described in more detail.

Particles (p)

According to one embodiment, the particles (p) comprise at least 60%, preferably at least 80%, for example, at least 90%, typically at least 95% by mass of associative polymers (P), relative to the total constituent mass of the particles, excluding water.

Typically, the particles consist only of partially hydrated associative polymers (P).

According to one embodiment, the particles in the suspension, once isolated and dried, are smaller than 4 mm, more preferably smaller than 3 mm. Moreover, they are generally larger than 50 µm and more preferably larger than 100 µm. Finally, the size of the particles obtained may be measured, for example, by granulometry or by sieving.

Suspension (S)

One advantage of the invention is that the suspension (S) has a fluid appearance prior to injection into the subterranean formation.

In the context of this invention, the mass volume of the particles relative to the total mass volume of the suspension (S) is generally less than 70%, preferably less than 60%.

Typically, the Bearden Consistency Index, designated as Bc, of the suspension (S) measured at 20° C. is less than 40 Bc.

According to one preferred embodiment, the Bearden Consistency Index of the suspension (S) at 20° C. is less than 30 Bc.

The Bearden Consistency Index may typically be measured using an atmospheric or pressurized consistometer commonly used in petroleum applications to measure the pumpability and/or consistency of a composition used. Typically, the consistency index is used in cementing operations to evaluate the transition of a cement slurry from a pumpable composition with a consistency in the range of 10 to 30 Bc to the cement setting corresponding to a sudden increase in consistency, reaching the maximum measurable value of 100 Bc.

A gel formed in the area to be treated having an elastic modulus equal to or greater than 50 Pa is generally expected to ensure fluid loss limitation or inhibition.

To this end, according to a typical embodiment, the content of associative polymers (P) is at least 0.5% by mass, for example, at least 1% by mass, preferably from 1% to 5% by mass, based on the total mass of the aqueous phase of the suspension (S).

Generally, the aqueous phase of the suspension (S) is a medium comprising water, preferably in an amount of at least 50% by mass, or even at least 80%, for example, at least 90%, or even at least 95% by mass. This aqueous medium may optionally include solvents other than water, for example, a water-miscible alcohol. The medium may also include other solvents which are not water-miscible.

The suspension (S) of this invention may optionally further comprise one or more additives. For example, weighting agents (e.g., mineral particles of baryte or calcium carbonate, charcoal particles . . . ), or common agents used for loss of circulation, such as fibers (wood bark, shredded cane stalks, mineral fibers and hair . . . ), or common agents used for circulation loss, such as fibers (wood bark, shredded cane stalks, mineral fibers and hair), flakes (mica flakes and pieces of plastic or cellophane sheets) or granular (ground and cut limestone or marble, wood, nuts, corncobs, and cotton hulls). In this case, the additives are generally present at a content of less than 20% by mass, preferably less than 10% by mass of the total mass of the suspension (S). Additives may be present in and/or mixed with the particles in the suspension (S).

The suspension of the invention is adapted to limit or even inhibit fluid loss in the subterranean formation by forming a gel in the area to be treated under the effect of temperature.

Typically, the suspension at the injection temperature (Ti) has a Bearden constancy (Bc) equal to or less than 30 Bc.

According to one embodiment, the difference between the injection temperature (Ti) and the temperature in the area to be treated (Tz) is at least 20° C., preferably at least 40° C.

The injection temperature (Ti) is typically less than or equal to 50° C., for example, between 0 and 40° C.

The temperature in the area to be treated (Tz) is generally greater than or equal to 60° C. and less than or equal to 300° C., preferably greater than or equal to 80° C. and less than or equal to 200° C., for example, greater than or equal to 120° C. and less than or equal to 180° C.

Gelation of the suspension results in an increase in the consistency of the suspension (S) in the area to be treated. Typically, it is preferable to use a suspension (S) which, at the area's temperature to be treated, gives a BC (Bearden Consistency Index) greater than 40, for example, greater than or equal to 80, or even 100.

The critical gelation temperature is closely related to the salt concentration in the suspension. Therefore, it is desirable to maintain this salt concentration after the injection and avoid dilution phenomena before the arrival to the area to be treated, which would otherwise induce a decrease in the critical temperature and gelling before the arrival to the area to be treated.

In the area to be treated, however, it may prove advantageous to obtain a dilution effect. In practice, this dilution effect is generally obtained in the desired zone for operations to inhibit fluid loss. In fact, most often, the area where the loss of fluid occurs has a salinity lower than that of the fluids injected, and when the suspension is in contact with the water losses in the area to be treated, the level of the salts in the suspension decreases upon dilution in water, which promotes gelation of the polymers.

According to the invention, the suspension is particularly well suited for the desired application by leaving fluid in advance of the area where it is to be used and activating only in that area.

Therefore, according to an interesting embodiment, it may be useful to use step (Et0) prior to step (Et) of the method of this invention, where a salt solution, generally having the same salt content as the suspension (S), is introduced into the subsurface formation. The saline solution may be injected in the form of a lost circulation pill known in the field.

Associative Polymers (P)

hydrophilic monomers (mh)

As a non-limiting example of a hydrophilic monomer constituting the chain (C) according to the invention, we may cite in particular:
- ethylenically unsaturated carboxylic acids, sulfonic acids, and phosphonic acids, and/or its derivatives such as acrylic acid (AA), methacrylic acid, ethacrylic acid, α-chloroacrylic acid, crotonic acid, maleic acid, maleic anhydride, itaconic acid, citraconic acid, mesaconic acid, glutaconic acid, aconitic acid, fumaric acid, monoesters of monoethylenically unsaturated dicarboxylic acids having 1 to 3, preferably 1 to 2, carbon atoms, e.g., monomethyl maleate, vinylsulfonic acid, (meth)allylsulfonic acid, sulfoethyl acrylate, sulfoethyl methacrylate, sulfopropyl acrylate, sulfopropyl methacrylate, 1-allyloxy-2-hydroylpropyl sulfonate 2-hydroxy-3-acryloyloxypropylsulfonic acid, 2-hydroxy-3-methacryloyloxypropylsulfonic acid, styrene sulfonic acids, 2-acrylamido-2-methylpropanesulfonic acid, vinylphosphonic acid, α-methyl vinylphosphonic acid, and allylphosphonic acid;
- esters of ethylenically α,β-unsaturated mono- and dicarboxylic acids with C2-C3-alkanediols, e.g., 2-hydroxyethyl acrylate, 2-hydroxyethyl methacrylate 2-hydroxyethyl ethacrylate, 2-hydroxypropyl acrylate, 2-hydroxypropyl methacrylate, 3-hydroxypropyl acrylate, 3-hydroxypropyl methacrylate, and polyalkylene glycol (meth)acrylates;
- amides of ethylenically α,β-unsaturated mono-carboxylic acid and their N-alkyl and N,N-dialkyl derivatives such as acrylamide, methacrylamide, N-methyl(meth)acrylamide, N-ethyl(meth)acrylamide N-isopropyl(meth)acrylamide, N,N-dimethyl(meth)acrylamide, N,N-diethyl(meth)acrylamide, morpholinyl(meth)acrylamide, and metholyl acrylamide (acrylamide and N,N-dimethyl(meth)acrylamide are particularly interesting);
- N-vinyllactams and its derivatives, for example, N-vinylpyrrolidone, N-vinylpiperidine;
- N-vinylamide compounds with open chains, for example, N-vinylformamide, N-vinyl-N-methylformamide, N-vinylacetamide, N-vinyl-N-methylacetamide, N-vinyl-N-ethylacetamide, N-vinylpropanamide, N-vinyl-N-methylpropionamide, and N-vinylbutyramide;
- esters of ethylenically α,β-unsaturated mono- and dicarboxylic acids with amino alcohols, for example, N,N-dimethylaminomethyl (meth)acrylate, N,N-dimethylaminoethyl (meth)acrylate, N,N-diethylaminoethyl acrylate, and N,N-dimethylaminopropyl (meth)acrylate;
- amides of ethylenically α,β-unsaturated mono- and dicarboxylic acid with diamines comprising at least one primary or secondary amino group, such as N-[2-(dimethylamino)ethyl]acrylamide N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, and N-[4-(dimethylamino)butyl]methacrylamide;
- N-diallylamines, N,N-diallyl-N-alkylamines, their acid addition salts, and their quaternization products, the alkyl used here preferably being C1-C3-alkyl;
- compounds of N,N-diallyl-N-methylamine and N,N-diallyl-N,N-dimethylammonium, for example, chlorides and bromides;
- vinyl- and allyl-substituted nitrogen heterocycles, e.g., N-vinylimidazole, N-vinyl-2-methylimidazole, vinyl- and allyl-substituted heteroaromatics, e.g., 2- and 4-vinylpyridine, 2- and 4-allylpyridine, and their salts;
- sulfobetaines; and
- salts of the abovementioned monomers;
- mixtures and association of two or more of the monomers and/or their salts mentioned above.

According to one particular embodiment, these monomers may, in particular, comprise acrylic acid (AA).

According to another embodiment, the hydrophilic monomers of chain (C) include (and typically consist of) (meth)acrylamide monomers, or more generally (meth)acrylamido monomers, including:
- acrylamido monomers, i.e., acrylamide (Am), dimethylacrylamide (DMA), its sulfonate derivative, in particular, acrylamido methylpropane sulfonic acids (AMPS), quaternary ammonium (APTAC) and sulfopropyl dimethylammonium propyl acrylamide;
- methacrylamide monomers, such as sulfopropyl dimethylammonium propyl methacrylamide (SPP), sulfohydroxypropyl dimethyl ammonium propyl methacrylamide.

According to one particular embodiment, the hydrophilic monomers of the chain (C) are acrylamides. An acrylamide is preferably an acrylamide not stabilized with copper.

According to one specific embodiment, the hydrophilic monomers of chain (C) are selected from acrylamides, dimethylacrylamide (DMA), acrylamido methylpropane sulfonic acids (AMPS), acrylic acids (AA), their salts, and their mixtures.

According to one specific embodiment, the hydrophilic monomers of the chain (C) may typically have a polymerizable function of the acrylamido type and a side chain composed of ethylene oxide or propylene oxide linkages or based on N-isopropylacrylamide or N-vinylcaprolactam.

Hydrophobic Monomers (mH)

As a non-limiting example of a hydrophobic monomer constituting the non-soluble blocks usable according to the invention, we may in particular cite:

vinyl aromatic monomers such as styrene, alpha methylstyrene, parachloromethylstyrene, vinyltoluene, 2-methylstyrene, 4-methylstyrene, 2-(n-butyl) styrene, 4-(n-decyl) styrene, tert-butylstyrene;

halogenated vinyl compounds, such as vinyl or vinylidene halides, such as vinyl or vinylidene chlorides or fluoride, corresponding to the formula $R_bR_cC=CX^1X^2$, where:

$X^1$=F or Cl

X2=H, F or Cl each of $R_b$ and $R_c$ represents, independently: H, Cl, F; or an alkyl group, preferably chlorinated and/or fluorinated, more preferably perchlorinated or perfluorinated;

esters of ethylenically α,β-unsaturated mono- and dicarboxylic acids with C2-C30-alkanols, for example, methyl ethacrylate, ethyl (meth) acrylate, ethyl ethacrylate, n-propyl (meth) acrylate, isopropyl (meth) acrylate, n-butyl (meth) acrylate, sec-butyl (meth) acrylate, tert-butyl (meth) acrylate, tert-butyl ethacrylate, n-hexyl (meth) acrylate, n-heptyl (meth) acrylate, n-octyl (meth) acrylate, 1,1,3 (meth) acrylate, 3-tetramethylbutyl, ethylhexyl (meth) acrylate, n-nonyl (meth) acrylate, n-decyl (meth) acrylate, n-undecyl (meth) acrylate, tridecyl (meth) acrylate, myristyl (meth) acrylate, pentadecyl (meth) acrylate, palmityl (meth) acrylate, heptadecyl (meth) acrylate, nonadecyl (meth) acrylate, arachinyl (meth) acrylate, behenyl (meth) acrylate, lignoceryl (meth) acrylate, cerotinyl (meth) acrylate, melissinyl (meth) acrylate, (meth) acrylate of palmitoleoyl, oleyl (meth) acrylate, linolyl (meth) acrylate, linolenyl (meth) acrylate, stearyl (meth) acrylate, lauryl (meth) acrylate and mixtures thereof;

vinyl or allyl alcohol esters with C1-C30 monocarboxylic acids, for example, vinyl formate, vinyl acetate, vinyl propionate, vinyl butyrate, vinyl laurate, vinyl stearate, vinyl propionate, vinyl versatate, and mixtures thereof;

ethylenically unsaturated nitriles, such as acrylonitrile, methacrylonitrile, and mixtures thereof;

esters of ethylenically α,β-unsaturated mono- and dicarboxylic acids with C3-C30 alkanediols, for example, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, and 3-hydroxy-2-ethylhexyl methacrylate;

primary amides of ethylenically α,β-unsaturated mono- and di-carboxylic acids and N-alkyl and N,N-dialkyl derivatives, such as N-propyl(meth)acrylamide, N-(n-butyl)(meth)acrylamide, N-(cert-butyl)(meth)acrylamide N-(n-octyl)(meth)acrylamide, N-(1,1,3,3-tetramethylbutyl)(meth)acrylamide, N-ethylhexyl(meth) acrylamide, N-(n-nonyl)(meth)acrylamide, N-(n-decyl) (meth)acrylamide, N-(n-undecyl)(meth)acrylamide, N-tridecyl(meth)acrylamide, N-myristyl(meth)acrylamide, N-pentadecyl(meth)acrylamide, N-palmityl (meth)acrylamide, N-heptadecyl(meth)acrylamide, N-nonadecyl(meth)acrylamide, N-arachinyl(meth) acrylamide, N-behenyl(meth)acrylamide, N-lignoceryl (meth)acrylamide N-cerotinyl(meth)acrylamide, N-melissinyl(meth)acrylamide, N-palmitoleoyl(meth) acrylamide, N-oleyl(meth)acrylamide, N-linolyl(meth) acrylamide, N-linolenyl(meth)acrylamide, N-stearyl (meth)acrylamide, and N-lauryl(meth)acrylamide;

N-vinyllactams and its derivatives such as, N-vinyl-5-ethyl-2-pyrrolidone, N-vinyl-6-methyl-2-piperidone, N-vinyl-6-ethyl-2-piperidone, N-vinyl-7-methyl-2-caprolactam and N-vinyl-7-ethyl-2-caprolactam;

esters of ethylenically α,β-unsaturated mono- and dicarboxylic acids with amino alcohols, for example, N,N-dimethylaminocyclohexyl (meth) acrylate;

amides of ethylenically α,β-unsaturated mono- and dicarboxylic acids with diamines comprising at least one primary or secondary amino group, e.g., N-[4-(dimethylamino)butyl]acrylamide N-[4-(dimethylamino)butyl] methacrylamide, N-[2-(diethylamino)ethyl]acrylamide, N-[4-(dimethylamino)cyclohexyl]acrylamide, N-[4-(dimethylamino)cyclohexyl]methacrylamide and C2-C8 monoolefins and nonaromatic hydrocarbons comprising at least two conjugated double bonds, such as ethylene, propylene, isobutylene, isoprene, and butadiene.

According to one preferred embodiment, the hydrophobic monomers used according to the invention may be selected from:

alpha-beta unsaturated alkyl esters of C1-C30 alkyl, preferably of C4-C22 alkyl, in particular, alkyl acrylates and methacrylate, such as methyl, ethyl or butyl acrylates and methacrylate, 2-ethylhexyl, isoactyl, lauryl, isodecyl, or stearyl (lauryl methacrylate, in particular, is particularly interesting);

alpha-beta unsaturated alkyl amides of C1-C30 alkyl, preferably of C4-C22 alkyl, in particular, alkyl acrylamide and methacrylamide, such as methyl, ethyl, butyl, 2-ethylhexyl, isoactyl, lauryl, isodecyl or stearyl acrylamide, and methacrylamide (lauryl methacrylamide, in particular, is especially interesting);

vinyl or allyl alcohol esters of saturated carboxylic acids such as vinyl or allyl acetate, propionate, versatate, or stearate;

alpha-beta unsaturated nitriles containing 3 to 12 carbon atoms, such as acrylonitrile or methacrylonitrile, alpha-olefins and conjugated dienes;

vinyl aromatic monomers such as styrene, alpha methylstyrene, parachloromethylstyrene, vinyltoluene, 2-methylstyrene, 4-methylstyrene, 2-(n-butyl) styrene, 4-(n-decyl) styrene, tert-butylstyrene;

mixtures and association of two or more of the monomers mentioned above.

According to one particular embodiment, the synthesized polymers of the invention may have a molecular weight greater than 500,000 g/mol, preferably greater than 1,000,000 g/mol, and even up to 2,000,000 may be achieved.

According to one particular embodiment, the polymers may have a molecular mass greater than or equal to 2,000,000 g/mol, for example between 2,000,000 and 3,000,000 g/mol, even up to 4,000,000 g/mol.

Crosslinking Monomers (mR)

According to one particular embodiment of the invention, crosslinking monomers (mR) may be used in micellar polymerization.

Examples include N,N'-methylenebisacrylamide (MBA), N,N'-ethylenebisacrylamide, di-acrylate polyethylene glycol (PEG), triacrylate, divinyl ether, typically trifunctional divinyl ether tri (ethylene glycol) divinyl ether (TEGDE), N-diallylamines, N,N-diallyl-N-alkylamines, their acid addition salts, and quaternization products, the alkyl used here being preferably C1-C3-alkyl; N,N-diallyl-N-methylamine and N,N-diallyl-N,N-dimethylammonium compounds, e.g., chlorides and bromides; or ethoxylated trimethylolpropane triacylate, ditrimethylolpropane tetraacrylate (DiTMPTTA).

Typically, the concentration of monomers (mR) is 100 to 10,000 ppm (parts per million by mass) by mass relative to the total mass of all monomers present in the medium (E). Preferably, the monomers (mR) are used in a concentration of 100 to 1000 ppm, preferably 200 to 600 ppm, for example, 300 to 500 ppm, by mass relative to the total mass of all the monomers present in the medium (E).

Typically, the molar ratio (mR)/(mh), which corresponds to the amount of crosslinking monomers (mR) relative to the total amount of hydrophilic monomers, is between 0.01 to 0,1%.

Micellar Radical Polymerization

Micellar polymerization schematically consists of polymerizing hydrophilic monomers in a hydrophilic medium comprising micelles, including hydrophobic monomers. Examples of micellar polymerization have in particular been described in U.S. Pat. No. 4,432,881 or else in polymer, vol. 36, No. 16, pp. 3197-3211 (1996), which may be referred to for further details.

The micellar polymerization technique allows interesting control of the hydrophobic units introduced into the polymers formed, i.e.:
- global control of the molar fraction of hydrophobic units in the polymer (by modulating the ratio of the concentrations of the two monomers); and
- more specific control of the number of hydrophobic units present in each hydrophobic block (by modifying the parameters influencing the nH defined above).

The polymers obtained in micellar polymerization are amphiphilic block polymers which have a specific controlled structure, i.e., schematically, based on a backbone formed of hydrophilic units (water-soluble or water-dispersible) interrupted in different places by small hydrophobic sequences, these hydrophobic sequences ("hydrophobic blocks") all have a number of substantially identical monomer units.

The chain (C), which is obtained by micellar polymerization, comprises:
- a hydrophilic component, constituted by hydrophilic monomers, which corresponds to a hydrophilic polymer chain that would have a solubility typically greater than or equal to 1% (10,000 ppm) at 20° C. if it were introduced alone into an aqueous solution containing salts;
- a hydrophobic component, consisting of hydrophobic sequences, each having a solubility typically less than or equal to 0.1% (1,000 ppm) at 20° C. in an aqueous solution containing salts.

In many cases, the chain (C) may be described as a hydrophilic chain having the solubility mentioned above (at least 1%) onto which pendant hydrophobic groups are grafted. In particular, in this case, the chain (C) has a swelling rate of less than 50 g/g, preferably less than 40 g/g.

According to one particularly interesting embodiment, the chain (C) is of the type obtained by a process comprising a micellar radical polymerization step (E) in which contact is made, within an aqueous medium (M):
- hydrophilic monomers, dissolved or dispersed in said aqueous medium (M) (typically water or a water/alcohol mixture);
- hydrophobic monomers in the form of a micellar solution, i.e., containing, in the dispersed state within the medium (M), micelles comprising these hydrophobic monomers (this dispersed state may, in particular, be obtained by using at least one surfactant); and
- at least one radical polymerization initiator, this initiator typically being water-soluble or water-dispersible.

According to one preferred embodiment, the polymer compositions according to the invention are polymers as obtained according to a micellar radical polymerization step (E) which is specifically a radical polymerization of the controlled type, i.e., conducted in the presence of a radical polymerization control agent. The term "radical polymerization control agent" (or more simply "control agent") is understood to mean, within the meaning of this description, a compound capable of extending the lifetime of the growing polymer chains in a polymerization reaction and, preferably, to give the polymerization a living or controlled character.

According to one particularly interesting embodiment, the chain (C) is of the type obtained by a process comprising a micellar radical polymerization step (E) in which contact is made, within an aqueous medium (M):
- hydrophilic monomers, dissolved or dispersed in said aqueous medium (M) (typically water or a water/alcohol mixture);
- hydrophobic monomers in the form of a micellar solution, i.e., containing, in the dispersed state within the medium (M), micelles comprising these hydrophobic monomers (it being possible, in particular, to obtain this dispersed state with the help of at least one surfactant);
- at least one radical polymerization initiator, this initiator typically being water-soluble or water-dispersible; and
- at least one radical polymerization control agent.

In addition to the advantages associated with the implementation of micellar polymerization, when a radical polymerization control agent of the above type is used, it is possible to control the average molecular weight of the polymers obtained after step (E): this mass may be controlled by the amount of control agent used (for a given amount of hydrophilic monomers, the mass generally decreases as this amount increases).

Thus, when the step uses a radical polymerization control agent, the polymer compositions at the end of step (E) have a controlled average molar mass.

In a manner known per se, in step (E), the mass ratio (control agent)/(mH+mh) calculated by the ratio of the mass of the control agent to the total mass of monomers dictates the molecular weight obtained for the synthesized polymer. This ratio is advantageously between 20 and 1000 ppm by mass in step (E), for example, between 40 and 500 ppm by mass, in particular between 50 and 200 ppm by mass.

According to an interesting embodiment of the invention, in step (E), the initial concentration of control agent in the medium is selected such that the average molecular weight of the synthesized polymer is Mn greater than 500,000 g/mol, preferably greater than 1,000,000 g/mol, in particular between 1,000,000 and 10,000,000 g/mol (for example, between 2,000,000 and 5,000,000 g/mol).

According to one possible embodiment, in step (E), it is possible to use a control agent, which is an irreversible type radical polymerization control agent, typically selected from mercaptans such as mercaptopropionic acid, thioglycolic acid, mercaptoethanol, primary or secondary alcohols such as ethanol or isopropanol, or else formic acid and its salts.

Alternatively, according to a particularly interesting embodiment, the control agent used in step (E) is a reversible transfer agent such as implemented in controlled radical polymerizations designated under the terminology RAFT or MADIX, which typically implement a reversible addition-fragmentation transfer process, such as those described for example in WO96/30421, WO 98/01478, WO 99/35178, WO 98/58974, WO 00/75207, WO 01/42312, WO 99/35177, WO 99/31144, FR2794464 or WO 02/26836.

When a reversible type radical polymerization control agent is used, the polymers as obtained from step (E) exhibit, in addition to the advantages associated with the implementation of micellar polymerization (i.e., control of the mole fraction of hydrophobic units in the polymers; and control of the number of hydrophobic units in each hydrophobic block):
  control of the average molecular weight (which may be finely controlled by the amount of control agent used: for a given amount of hydrophilic monomers, the mass decreases as the amount increases); and
  control of the distribution of hydrophobic blocks within the various chains
  obtaining polymer chains with a living character, offering the possibility of preparing complex polymers with controlled architecture.

These advantages are specifically marked when the radical polymerization control agent used is a compound that is soluble or dispersible in the aqueous medium (M) used in step (E) and/or when this control agent is not suitable for penetrating the micelles of the micellar solution. This effect may also be observed when the control agent is not soluble/dispersible in the medium (M) or when the control agent is suitable for penetrating the micelles.

According to one particular embodiment, the control agent used in step (E) may be a polymer chain resulting from a controlled radical polymerization and carrying a group suitable for controlling a radical polymerization (a polymer chain known as a "living" polymer chain, of the well-known type per se). Thus, for example, the control agent may be a polymer chain (preferably hydrophilic or water-dispersible) functionalized at the end of the chain by a xanthate group or more generally comprising a —SC=S— group, for example, obtained according to RAFT/MADIX technology.

Alternatively, the control agent used in step (E) is a non-polymeric compound bearing a group ensuring the control of the radical polymerization, in particular a thiocarbonylthio —S(C=S)— group.

According to one interesting embodiment, the radical polymerization control agent used in step (E) is a compound that comprises a thiocarbonylthio-S(C=S)— group. Thus, for example, it can be a compound that comprises a xanthate group (bearing —SC=S—O— functions), for example, a xanthate. In addition, other types of control agents used in controlled radical polymerization may be considered (for example, of the type used in CMP, ATRP, or NMP).

Using a control agent for step (E) of this type in the polymerization reaction makes it possible to finely control the size of the polymer chains and the molecular weight, which makes it possible to modulate the properties of the polymer composition in a very fine and precise manner. It also induces homogeneity in the synthesized polymer composition, making it possible to obtain, at the end of step (E1), particles that all have substantially the same composition and properties.

According to a particular variant, the radical polymerization control agent used in step (E) is a polymer, advantageously an oligomer, of water-soluble or water-dispersible nature and bearing a thiocarbonylthio group. —S(C=S)—, for example, from a xanthate group —SC=S—O—). This polymer, capable of acting both as a polymerization control agent and as a monomer in step (E), is also referred to as "pre-polymer" in the following. Typically, this pre-polymer is obtained by radical polymerization of hydrophilic monomers in the presence of a control agent bearing a thiocarbonylthio group. —S(C=S)—, for example, a xanthate. Thus, for example, according to an interesting embodiment which is illustrated at the end of this description, the control agent used in step (E) may advantageously be a pre-polymer bearing a thiocarbonylthio group —S(C=S)—, for example, a xanthate group —SC=S—O—, obtained at the end of a step (E0) of controlled radical polymerization prior to step (E). In this step (E0), hydrophilic monomers, advantageously identical to those used in step (E), a free-radical polymerization initiator and a control agent bearing a thiocarbonylthio —S(C=S)— group, for example, a xanthate, may typically be brought into contact.

Implementation of the step mentioned above (E0) prior to step (E) makes it possible, schematically, to hydrophilize a large number of control agents bearing thiocarbonylthio functions (for example, xanthates, which are rather hydrophobic by nature) by converting them into pre-polymers that are soluble or dispersible in the medium (M) of step (E). Preferably, a pre-polymer synthesized in step (E0) has a short polymer chain, for example, comprising a chain of less than 50 or even less than 25 monomer units, for example, between 2 and 15.

The control agent used in step (E) or, where appropriate, in step (E0) of the method of the invention, is advantageously a compound bearing a thiocarbonylthio group —S(C=S)—. According to one particular embodiment, the control agent may bear several thiocarbonylthio groups. It may optionally be a polymer chain carrying such a group.

Thus, this control agent may, for example, respond to formula (A) below:

[Chem. 1]

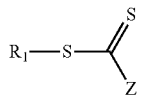

(A)

in which:
  Z represents:
  a hydrogen atom,
  a chlorine atom,
  an optionally substituted alkyl radical, optionally substituted aryl,
  an optionally substituted heterocycle,
  an optionally substituted alkylthio radical,
  an optionally substituted arylthiol radical,
  an optionally substituted alkoxy radical,
  an optionally substituted aryloxy radical,
  an optionally substituted amino radical,
  an optionally substituted hydrazine radical,
  an optionally substituted alkoxycarbonyl radical, an optionally substituted aryloxycarbonyl radical,
an optionally substituted carboxy or acyloxy radical,
an optionally substituted aryloxy radical,
an optionally substituted carbamoyl radical,
a cyano radical,
a dialkyl- or diaryl-phosphonate radical,
a dialkyl-phosphinato or diaryl-phosphinate radical, or
a polymer chain, and R1 represents:
an optionally substituted alkyl, acyl, aryl, aralkyl, alkene, or alkyne group,
a carbon ring or a heterocycle, saturated or not, aromatic optionally substituted, or
a polymer chain, preferably hydrophilic or water-dispersible when the agent is used in step (E).

When the R1 or Z groups are substituted, they may be optionally substituted by substituted phenyl groups, optionally substituted aromatic groups, saturated or unsaturated carbon rings, saturated or unsaturated heterocycles, or: alkoxycarbonyl or aryloxycarbonyl (—COOR), carboxy (—COOH), acyloxy (—O2CR), carbamoyl (—CONR2), cyano (—CN), alkylcarbonyl, alkylarylcarbonyl, arylcarbonyl, arylalkylcarbonyl, phthalimido, maleimide, amidimine, succinimine hydroxy (—OH), amino (—NR2), halogen, perfluoroalkyl CnF2n+1, allyl, epoxy, alkoxy (—OR), S-alkyl, S-aryl, groups having a hydrophilic or ionic character such as alkali salts of carboxylic acids, alkali salts of sulfonic acid, polyalkylene oxide chains (PEO, POP), the cationic substituents (quaternary ammonium salts), R representing an alkyl or aryl group, or a polymer chain.

For the control agents of formula (A) used in step (E), it is generally preferred that the group R1 is of hydrophilic nature. Advantageously, it is a water-soluble or water-dispersible polymer chain.

Group R1 may alternatively be amphiphilic, i.e., may have both a hydrophilic and a lipophilic character. However, it is preferable that R1 is not hydrophobic.

Regarding the control agents of formula (A) used in step (E0), R1 may typically be a substituted or unsubstituted, preferably substituted, alkyl group. A control agent of formula (A) used in step (E0) may nevertheless comprise other types of groups R1, particularly a polymer ring or chain.

The optionally substituted alkyl, acyl, aryl, aralkyl, or alkyne groups generally have 1 to 20 carbon atoms, preferably 1 to 12, and more preferably 1 to 9 carbon atoms. They may be linear or branched. They may also be substituted by oxygen atoms, particularly in the form of esters, sulfur, or nitrogen atoms.

Among the alkyl radicals, mention may be made in particular of the methyl, ethyl, propyl, butyl, pentyl, isopropyl, tert-butyl, pentyl, hexyl, octyl, decyl, or dodecyl radical.

Alkyne groups are radicals generally of 2 to 10 carbon atoms. They have at least one acetylenic unsaturation, such as the acetylenyl radical.

The acyl group is a radical generally having 1 to 20 carbon atoms with a carbonyl group.

Among the aryl radicals, we may mention in particular the phenyl radical, optionally substituted by a nitro or hydroxyl function.

Among the aralkyl radicals, we may mention in particular the benzyl or phenethyl radical, optionally substituted by a nitro or hydroxyl function.

When R1 or Z is a polymer chain, this polymer chain may be obtained from a radical or ionic polymerization or resulting from a polycondensation.

Advantageously, compounds bearing an S(C=S)O xanthate function, trithiocarbonate, dithiocarbamate or dithiocarbazate, for example, bearing an O-ethyl xanthate function of the formula S(C=S)OCH2CH3, are used as the control agent for step (E) and, if appropriate, for step (E0).

When step (E0) is carried out, it is particularly interesting to use, as control agents in this step, a compound selected from xanthates, trithiocarbonates, dithiocarbamates, or dithiocarbazates. The xanthates turn out to be particularly advantageous, in particular those bearing an O-ethyl xanthate function —S(C=S)OCH2CH3, such as O-ethyl-S-(1-methoxycarbonyl ethyl) xanthate (CH3CH(CO2CH3))S(C=S)OEt. Another possible control agent in step (E0) is dibenzyltrithiocarbonate of formula PhCH2S(C=S)SCH2Ph (or Ph=phenyle).

The living pre-polymers obtained in step (E0) using the control mentioned above agents prove to be particularly advantageous for carrying out step (E).

When used in step (E), the radical polymerization initiator is preferably water-soluble or water-dispersible. Apart from this preferred condition, any radical polymerization initiator (source of free radicals) known per se and suitable for the conditions selected for these steps may be used in step (E) and step (E0) of the method of the invention.

Thus, the radical polymerization initiator (initiator) used according to the invention may, for example, be selected from the initiators conventionally used in radical polymerization. For example, it may be one of the following initiators:

hydrogen peroxides such as: tertiary butyl hydroperoxide, cumene hydroperoxide, t-butyl-peroxyacetate, t-butyl-peroxybenzoate, t-butylperoxyoctoate, t-butylperoxyneodecanoate, t-butylperoxyisobutarate, lauroyl peroxide, t-amylperoxypivalte, t-butylperoxypivalate, dicumyl peroxide, benzoyl peroxide, potassium persulfate, ammonium persulfate, azo compounds such as: 2-2'-azobis(isobutyronitrile), 2,2'-azobis(2-butanenitrile), 4,4'-azobis(4-pentanoic acid), 1,1'-azobis(cyclohexane-carbonitrile), 2-(t-butylazo)-2-cyanopropane, 2,2'-azobis[2-methyl-N-(1,1)-bis(hydroxymethyl)-2-hydroxyethyl]propionamide, 2,2'-azobis(2-methyl-N-hydroxyethyl]-propionamide, 2,2'-azobis(N,N'-dimethyleneisobutyramidine) dichloride 2,2'-azobis(2-amidinopropane) dichloride, 2,2'-azobis(N,N'-dimethyleneisobutyramide), 2,2'-azobis(2-methyl-N-[1,1-bis (hydroxymethyl)-2-hydroxyethyl]propionamide) 2,2'-azobis(2-methyl-N-[1,1-bis (hydroxymethyl)ethyl]propionamide), 2,2'-azobis[2-methyl-N-(2-hydroxyethyl) propionamide], 2,2'-azobis(isobutyramide) dihydrate, redox systems comprising combinations such as:

mixtures of hydrogen or alkyl peroxide, peresters, percarbonates, and the like and any of the iron salts, titanium salts, zinc formaldehyde sulfoxylate or sodium formaldehyde sulfoxylate, and reducing sugars, persulfates, perborate or alkali metal or ammonium perchlorate in combination with an alkali metal bisulfite, such as sodium metabisulfite, and reducing sugars, and alkali metal persulfates in association with an arylphosphinic acid, such as benzene phosphonic acid and the like, and reducing sugars.

Typically, the amount of initiator to be used is preferably determined so that the amount of radicals generated is at most 50% by mole, preferably at most 20% by mole, relative to the amount of control or transfer agent.

Particularly in step (E), it generally proves interesting to use a radical initiator of the redox type, which has, among other things, the advantage of not requiring heating of the reaction medium (no thermal initiation) and which the inventors have now further discovered to be suitable for the micellar polymerization of step (E).

Thus, the radical polymerization initiator used in step (E) may typically be a redox initiator that does not usually require heating for their thermal initiation. It is typically a mixture of at least one oxidizing agent with at least one reducing agent.

The oxidizing agent present in this redox system is preferably a water-soluble agent. This oxidizing agent may, for example, be selected from peroxides, such as: hydrogen peroxide, tertiary butyl hydroperoxide, cumene hydroperoxide, t-butyl-peroxyacetate, t-butyl-peroxybenzoate, t-butylperoxyoctoate, t-butylperoxyyneodecanoate, t-butylperoxyisobutarate, peroxide lauroyl, t-amylperoxypivalte, t-butylperoxypivalate, dicumyl peroxide, benzoyl peroxide; sodium persulfate, potassium persulfate, ammonium persulfate, or even potassium bromate.

The reducing agent present in the redox system is also preferably a water-soluble agent. This reducing agent may typically be selected from sodium formaldehyde sulfoxylate (in particular in its dihydrate form, known under the name Rongalit or in the form of an anhydride), ascorbic acid, erythorbic acid, sulfites, bisulfites, or metal sulfites (alkali metal sulfites, bisulfites or metasulfites in particular), nitrilotrispropionamides, and tertiary amines and ethanolamines (preferably water-soluble).

Possible redox systems include combinations such as:
mixtures of water-soluble persulfates with water-soluble tertiary amines,
mixtures of water-soluble bromates (alkali metal bromate) with water-soluble sulfites (alkali metal sulfites),
mixtures of hydrogen or alkyl peroxide, peresters, percarbonates, and the like and any of the iron salts, titanium salts, zinc formaldehyde sulfoxylate or sodium formaldehyde sulfoxylate, and reducing sugars,
persulfates, perborate or alkali metal or ammonium perchlorate in combination with an alkali metal bisulfite, such as sodium metabisulfite, and reducing sugars, and
alkali metal persulfates in association with an arylphosphinic acid, such as benzene phosphonic acid and the like, and reducing sugars.

An interesting redox system comprises (and preferably consists of) the combination of ammonium persulfate and sodium formaldehyde sulfoxylate.

In general, particularly when using a redox system of the ammonium persulfate/sodium formaldehyde sulfoxylate type, it is preferable that the reaction medium of step (E) be free of copper. However, if copper is present, it is generally desirable to add a copper complexing agent, such as EDTA, in an amount suitable for masking its presence.

Whatever the nature of the initiator employed, the radical polymerization of step (E0) can be carried out in any suitable physical form, for example, in a water solution or a solvent such as an alcohol or THF, in mass, if necessary by controlling the temperature and/or the pH to render the species liquid and/or soluble or insoluble.

After carrying out step (E), considering the specific use of a control agent, polymers functionalized by transfer groups (living polymers) are obtained. This living character makes it possible, if desired, to use these polymers in a subsequent polymerization reaction, according to a well-known technique per se. Alternatively, if necessary, it is possible to deactivate or destroy the transfer groups, for example, by hydrolysis, ozonolysis, or reaction with amines, according to means known per se. Thus, according to a particular embodiment, the method of the invention may comprise, after step (E), a step (E1) of hydrolysis, ozonolysis, or a reaction with amines, suitable for deactivating and/or destroying all or part of the transfer groups present on the polymer prepared in step (E).

Without limitation, any suitable surfactant may be used to produce the micellar solution of the hydrophobic monomers used in step (E). For example, it is possible to use surfactants selected from the following list:

Anionic surfactants may be selected from:
alkyl ester sulfonates, e.g., of the formula R—CH(SO3M)-CH2COOR', or alkyl ester sulfates, e.g., of the formula R—CH(OSO3M)-CH2COOR', where R represents an alkyl radical in C8-C20, preferably in C10-C16, R' is an alkyl radical in C1-C6, preferably in C1-C3, and M is an alkaline earth metal cation, e.g., sodium, or the ammonium cation Particularly noteworthy are the methyl ester sulfonates with a C14-C16 radical R;
alkylbenzenesulfonates, especially in C9-C20, primary or secondary alkylsulfonates, especially in C8-C22, alkylglycerol sulfonates;
alkylsulfates, for example of the formula ROSO3M, where R represents an alkyl or hydroxyalkyl radical in C10-C24, preferably in C12-C20; M represents a cation of the same definition as above;
alkyl ether sulfates, for example of the formula RO(OA)nSO3M where R represents an alkyl or hydroxyalkyl radical in C10-C24, preferably in C12-C20; OA representing an ethoxylated and/or propoxylated group; M representing a cation of the same definition as above, n generally varying from 1 to 4, as for example lauryl ether sulfate with n=2;
alkylamide sulfates, for example of the formula RCONHR'OSO3M where R is an alkyl radical in C2-C22, preferably in C6-C20, R' is an alkyl radical in C2-C3, M representing a cation of the same definition as above, as well as their polyalkoxylated (ethoxylated and/or propoxylated) derivatives (alkylamidoether sulfates;
salts of saturated or unsaturated fatty acids, for example, such as those in C8-C24, preferably in C14-C20 and those of an alkaline earth cation, N-acyl N-alkyltaurates, alkylisethionates, alkylsuccinamates, and alkyl sulfosuccinates, alkyl glutamates, monoesters or diesters of sulfosuccinates, N-acyl sarcosinates, polyethoxycarboxylates;
mono and di ester phosphates, for example of the following formula: (RO)x-P(=O)(OM)x or R represents an alkyl, alkylaryl, arylalkyl, aryl, optionally polyalkoxylated radical, x and x' being equal to 1 or 2, with the proviso that the sum of x and x' is equal to 3, M representing an alkaline earth cation;

Nonionic surfactants may be selected from:
alkoxylated fatty alcohols; i.e., laureth-2, laureth-4, laureth-7, oleth-20, alkoxylated triglycerides, alkoxylated fatty acids, alkoxylated sorbitan esters, alkoxylated fatty amines, alkoxylated diphenyl-1-ethyl) phenols, alkoxylated tri(phenyl-1-ethyl) phenols, alkoxylated alkylphenols, products resulting from the condensation of ethylene oxide with a hydrophobic compound resulting from the condensation of propylene oxide with propylene glycol, such as Pluronic marketed by BASF; products resulting from the condensation of ethylene oxide, the compound resulting from the condensation of propylene oxide with ethylenediamine, such as Tetronic marketed by BASF; alkylpolyglycosides such as those described in U.S. Pat. No. 4,565,647 or alkylglucosides; fatty acid amides, i.e., C8-C20, especially fatty acid monoalkanolamides, i.e., cocamide MEA or cocamide MIPA;

Amphoteric surfactants (true amphoterics comprising an ionic group and a potentially ionic group of opposite charge, or zwitterionics that simultaneously comprise two opposite charges) may be:

betaines in general, in particular, carboxybetaine, e.g., lauryl betaine (Mirataine BB from the Solvay company) or octylbetaine or cocobetaine (Mirataine BB-FLA from Solvay); amidoalkyl betaines, such as cocamidopropyl betaine (CAPB) (Mirataine BDJ from the Solvay company or Mirataine BET C-30 from Solvay);

sulfo-betaines or sultaines such as cocamidopropyl hydroxy sultaine (Mirataine CBS from the Solvay company);

alkylamphoacetates and alkylamphodiacetates, such as, for example, comprising a coco, or lauryl chain (Miranol C2M Conc NP, C32, L32 in particular, from the Solvay company);

alkylamphopropionates or alkylamphodipropionates, (Miranol C2M SF);

alkyl amphohydroxypropyl sultaines (Miranol CS), alkyl amine oxides, for example, lauramine oxide;

The cationic surfactants may be salts of primary, secondary or tertiary fatty amines, optionally polyethoxylated, quaternary ammonium salts such as tetraalkylammonium, alkylamidoalkylammonium, trialkylbenzylammonium, trialkylhydroxyalkylammonium or alkylpyridinium chlorides or bromides, imidazoline derivatives, and amine oxides of a cationic nature. An example of a cationic surfactant is cetrimonium chloride or bromide.

The surfactants used according to this invention may be block copolymers containing at least one hydrophilic block and at least one hydrophobic block distinct from the hydrophilic block, advantageously obtained according to a polymerization method where:

(a0) at least one hydrophilic (respectively hydrophobic) monomer, at least one source of free radicals, and at least one free-radical polymerization control agent of the —S(C=S)— type are brought together in an aqueous phase;

(a1) the polymer obtained from step (a0) is brought into contact with at least one hydrophobic (respectively hydrophilic) monomer distinct from the monomer used in step (a0) and at least one free-radical source;

whereby a diblock copolymer is obtained.

Polymers of the triblock type, or those comprising more blocks, may optionally be obtained by implementing, after step (a1), a step (a2) in which the polymer obtained from step (a1) is brought into contact with at least one monomer distinct from the monomer used in step (a1) and at least one source of free radicals; and more generally, by implementing (n+1) steps of the type of steps (a1) and (a2) above and n is an integer typically ranging from 1 to 3, wherein each step (an), with n≥1: the polymer obtained from step (an-1) is brought into contact with at least one monomer distinct from the monomer used in step (an-1) and at least one source of free radicals. For example, copolymers of the type described in WO03068827, WO03068848, and WO2005/021612 may be used according to the invention.

According to one particular mode, the hydrophobic monomers present within surfactant micelles used in micellar polymerization may be monomers that have the property of forming micelles themselves without needing to add additional surfactants (known as "self-micellating" monomers in the following description). According to this particular mode, the surfactant used may be the self-micellating hydrophobic monomer itself, used without any other surfactant, although the presence of such additional surfactant is not excluded. Thus, within the meaning of this description, when reference is made to hydrophobic monomers within surfactant micelles, this notion includes both (i) hydrophobic monomers present within surfactant micelles other than these monomers and (ii) monomers comprising at least a hydrophobic portion or block and forming the micelles by themselves in an aqueous medium. The two modes (i) and (ii) mentioned above are compatible and may coexist (hydrophobic monomers within micelles formed by another self-micellating monomer, for example, or micelles comprising a combination of surfactants and self-micellating monomers).

Different aspects and advantages of the invention will be further illustrated by the examples below in which polymers were prepared according to the method of the invention.

EXAMPLE

Example 1—Synthesis and Preparation of the Polymer Powder

According to the invention, the preparation of the associative polymer powder takes place in 3 steps. First, the synthesis of a polymer gel, drying this gel and then grinding to obtain a powder.

Synthesis of Associative Polymer

An associative polymer (P) polyacrylamide co-acrylamido methyl propyl sulfonic co-lauryl methacrylate (poly Am/AMPS/LMA) is synthesized according to the following protocol:

In a 500 ml HDPE flask was introduced, at room temperature (20° C.), 73.8 g of sodium dodecyl sulfate (SDS), 216.8 g of distilled water, and 9.42 g of lauryl methacrylate (LMA). The mixture was stirred using a bar magnet for 6 hrs. until a clear micellar solution was obtained. In a Dewar flask (2000 ml) equipped with a lid that makes an atmospheric seal possible, 168 g of the micellar solution thus prepared, 530.5 g of water, 592.1 g of acrylamide (50% by weight aqueous solution), 477.4 g of AMPS (51% by weight aqueous solution), 5.56 g of Rhodixan A1 (O-ethyl S-(1-methoxycarbonyl) ethyl xanthate—1.0% ethanolic solution by weight) and 8.68 g of ammonium persulfate (5% by weight aqueous solution) are introduced at room temperature (20° C.). The mixture was degassed by nitrogen bubbling for 40 minutes 17.6 g of sodium formaldehyde sulfoxylate, as a 1% aqueous solution by weight, was added to the medium all at once. The mixture was degassed beforehand by bubbling nitrogen for 15 minutes. The polymerization reaction was then allowed to proceed for 16 hours, whereby the polymer (P) was obtained in the form of a gel.

The polymer gel thus obtained is then extruded through a meat grinder (Bosch pro-power 2200 W model equipped with a 3 mm grid). Finally, the extruded gel granules are dried using a fluid bed dryer under an airflow temperature of 80° C. An Alpine pin mill then grinds the dried polymer granules. The powder obtained comprises 85% by mass of particles smaller than 250 μm and 15% between 250 and 750 μm.

Example 2—Swelling Rate and Pumpability of the Suspension (S) at Room Temperature According to the invention, the polymer obtained in Example 1 is evaluated in the preparation of suspensions (S).

But, first, the swelling rate after 1 hour of immersion in a saline solution at 25° C. is determined according to the test protocol described above.

TABLE 1

| Concentration in salt (%) | 0 | 1 | 2 | 5 | 10 | 15 | 20 |
|---|---|---|---|---|---|---|---|
| NaCl swelling rate | 335 | 45.0 | 41.5 | 27.4 | 47.3 | 19.3 | 17.7 |
| CaCl$_2$ swelling rate | 330 | 22.7 | 20.3 | 16.5 | 13.7 | 16.8 | 16.8 |

The swelling rates determined here show that a minimum salt concentration of 5% for NaCl and 1% for CaCl$_2$ is necessary to make a pumpable suspension at room temperature.

The flow viscosities of the suspensions (S) in a 10% NaCl solution are determined. This measurement is carried out at 25° C. using a DHR2 rheometer equipped with a Couette cell comprising a helical rotor under a constant shear of 100 s−1.

TABLE 2

| Mass of polymers (g/100 g solution) | 0.5 | 1 | 2 | 3 | 3.5 | 4 |
|---|---|---|---|---|---|---|
| Volume fraction | 9.5 | 19 | 38 | 57 | 66.5 | 76 |
| Viscosity of the suspension (cP) | 13 | 9 | 54 | 136 | 270 | 650 |

A maximum concentration of 3.5% polymer may be implemented here. Beyond this, the viscosity of the suspension is too high to be pumpable.

Example 3—DHR2 Determination of the Critical Gelation Temperature (° C.) as a Function of the Salt Concentration The swelling of the polymer obtained in Example 1 is evaluated as a function of the temperature and the salinity to estimate the suspension's critical gelation temperature (S). When the swelling rate increases abruptly with the temperature, the gelling temperature is considered to have been reached. The swelling rates are estimated after 1 hour of immersion in a 10% NaCl saline solution at the right temperature

TABLE 3

| Temperature (° C.) | Swelling rate (g/g) |
|---|---|
| 25 | 23 |
| 40 | 27 |
| 60 | 31 |
| 80 | 53 |

Therefore, the critical gelation temperature for a 10% salt concentration is between 60° C. and 80° C.

Example 4. Evaluation of the Gel Elasticity Above the Critical Gelation Temperature Having established that the critical gelation temperature is 60° C. for a 10% NaCl aqueous solution, the variable concentrations of polymer suspensions are heated at 90° C. for 30 minutes before proceeding to measure the elastic modulus of the gel thus obtained. This measurement is carried out at 90° C. using a DHR2 rheometer equipped with a Couette cell comprising a helical rotor.

TABLE 4

| Polymer mass (g/100 g of a 10% NaCl solution) | 0.5 | 1 | 2 | 3 | 3.5 | 4 |
|---|---|---|---|---|---|---|
| Elastic modulus (Pa) |  | 2 | 16 | 64 | 162 | 180 | 201 |

The elastic modulus is determined at an oscillation frequency of 1 Hz at 90° C. Therefore, it appears that a uniform gel is formed from the suspension (S) even at a low polymer content of 0.5 g/100 g.

Example 5: Formulation & HTHP Consistometer Test Controlled by the Concentration of NaCl or CaCl$_2$ in the Aqueous Solution For an evaluation of the pumpability and gel setting of a suspension (S) around a well bottom temperature of 110° C., a pressurized consistometer is used (Chandler single-cell pressurized consistometer—model 8-25-45). This allows the suspension to have a temperature ramp from 2° C. per minute up to a temperature of 110° C. under increasing pressure of 16 bars per minute up to a static pressure of 483 bars once the temperature of 110° C. has been reached. The suspension (S) is kept under agitation at 150 RPM until the maximum consistency of 100 Bc is reached. 600 ml of saline solution is placed in a mixer of the Waring type to fill the consistometer cell. 42 g of petroleum charcoal are then added with stirring as reinforcing fillers, and then 18 g of polymer powder from Example 1 are added.

TABLE 5

| Concentration in NaCl (%) | 10 | 15 | 18 |
|---|---|---|---|
| Consistency @ 25° C. (Bc) | 17 | 13 | 16 |
| Time @ 40 Bc (mn) | 28.5 | 43 | 53 |
| Time @ 70 Bc (mn) | 30.25 | 46 | 60.5 |
| Time @ 100 Bc (mn) | 31.05 | 47.7 | 72 |
| Temperature @ 40 Bc (° C.) | 68 | 97 | 111 |
| Temperature @ 70 Bc (° C.) | 72.5 | 104.5 | 112 |
| Temperature @ 100 Bc (° C.) | 75 | 106.5 | 112 |

TABLE 6

| Concentration in CaCl2 (%) | 15 | 16 | 17 |
|---|---|---|---|
| Consistency @ 25° C. (Bc) | 11 | 18 | 15 |
| Time @ 40 Bc (mn) | 45 | 47 | 50 |
| Time @ 70 Bc (mn) | 50 | 53 | 60 |
| Time @ 100 Bc (mn) | 53 | 60 | 84 |
| Temperature @ 40 Bc (° C.) | 102 | 105 | 109 |
| Temperature @ 70 Bc (° C.) | 108 | 111 | 112 |
| Temperature @ 100 Bc (° C.) | 110 | 112 | 111 |

All these results show that on the one hand, the suspensions are easily pumpable at room temperature up to the temperature where the consistency reaches 40 Bc, which can be adjusted by modulating the salt concentration to be in the immediate vicinity of the temperature of the area to be treated (here 110° C.). Furthermore, it may be seen that this modularity may be quite precise with the variation in the salt concentration and may be controlled with different types of salts.

The invention claimed is:
1. A suspension, comprising:
an aqueous phase containing salts; and
within said aqueous phase, associative polymer-based particles added to the aqueous phase as non-hydrated associative polymer-based particles that partially hydrate upon addition to the aqueous phase, wherein the aqueous phase comprises a salt content sufficient to provide the partial hydration having a swelling ratio for the associative polymer-based particles ranging between 10 g/g and 50 g/g.

2. The suspension according to claim 1, wherein the salts are selected from the group consisting of monovalent, divalent, and multivalent salts.

3. The suspension according to claim 1, wherein the salt content is at least 5%, by mass of the total mass of the aqueous phase of the suspension.

4. The suspension according to claim 1, wherein the associative polymer has a weight average molecular weight (Mw) greater than 500,000 g/mol.

5. The suspension according to claim 1, wherein the associative polymer comprises at least one chain (C) obtained by micellar polymerization.

6. The suspension according to claim 5, in which the chain (C) of the associative polymer is obtained by a method comprising a step (E) of micellar radical polymerization in which the following is brought into contact within an aqueous medium (M):
   hydrophilic monomers (mh), dissolved or dispersed in said aqueous medium (M);
   hydrophobic monomers (mH) in the form of a micellar solution; and
   at least one radical polymerization initiator, wherein the initiator is water-soluble or water-dispersible; and
   at least one radical polymerization control agent.

7. The suspension according to claim 6, wherein the hydrophilic monomers (mh) are (meth)acrylamide monomers selected from the group consisting of:
   acrylamido monomers,
      quaternary ammonium (APTAC) and sulfopropyl dimethylammonium propyl acrylamide; and
   methacrylamide monomers.

8. The suspension according to claim 6, wherein the hydrophobic monomers (mH) are selected from the group consisting of:
   alpha-beta unsaturated alkyl esters of C1-C30 alkyl;
   alpha-beta unsaturated alkyl amides of C1-C30 alkyl;
   vinyl or allyl alcohol esters of saturated carboxylic acids;
   unsaturated alpha-beta nitriles containing 3 to 12 carbon atoms,
   alpha-olefins and conjugated dienes;
   vinyl aromatic monomers; and
   mixtures and combinations of two or more of the above monomers.

9. The suspension according to claim 6, wherein the free radical polymerization control agent is a compound that comprises a thiocarbonylthio —S(C=S)— group.

10. The suspension according to claim 6, wherein the particles comprise at least 60% by weight of associative polymers, based on the total constituent weight of the particles, excluding water.

11. The suspension according to claim 10, wherein the particles consist of associative polymers.

12. The suspension according to claim 1, wherein the mass volume of the particles relative to the total mass volume of the suspension is less than 70%.

13. A method comprising mixing particles (p0) based on non-hydrated associative polymers, water, and salts, whereby the suspension according to claim 1 is obtained.

14. A method, comprising: injecting into a subterranean formation the suspension according to claim 1 to limit or even inhibit fluid loss in the subterranean formation.

15. A method for limiting or inhibiting fluid loss within a subterranean formation, comprising a step (Et) of injecting into said subterranean formation at the zone exhibiting fluid loss, a suspension according to claim 1, wherein
   the injection temperature of the suspension is below the critical gelation temperature of the suspension; and
   the temperature in the zone to be treated is a temperature equal to or greater than the suspension's critical gelation temperature,
   whereby an increase in the viscosity of the suspension is obtained.

16. The suspension according to claim 1, wherein the suspension has a gelation temperature of from 60 C to 300 C.

17. The suspension according to claim 1, wherein the suspension has a Bearden Consistency Index of less than 40 Bc.

18. The suspension according to claim 1, wherein the associative polymer-based particles are in an amount of from 0.5 wt % to 5 wt %.

* * * * *